Nov. 14, 1933.  O. W. HINER  1,934,801
NOSE TONG FOR LIVESTOCK
Filed July 12, 1932
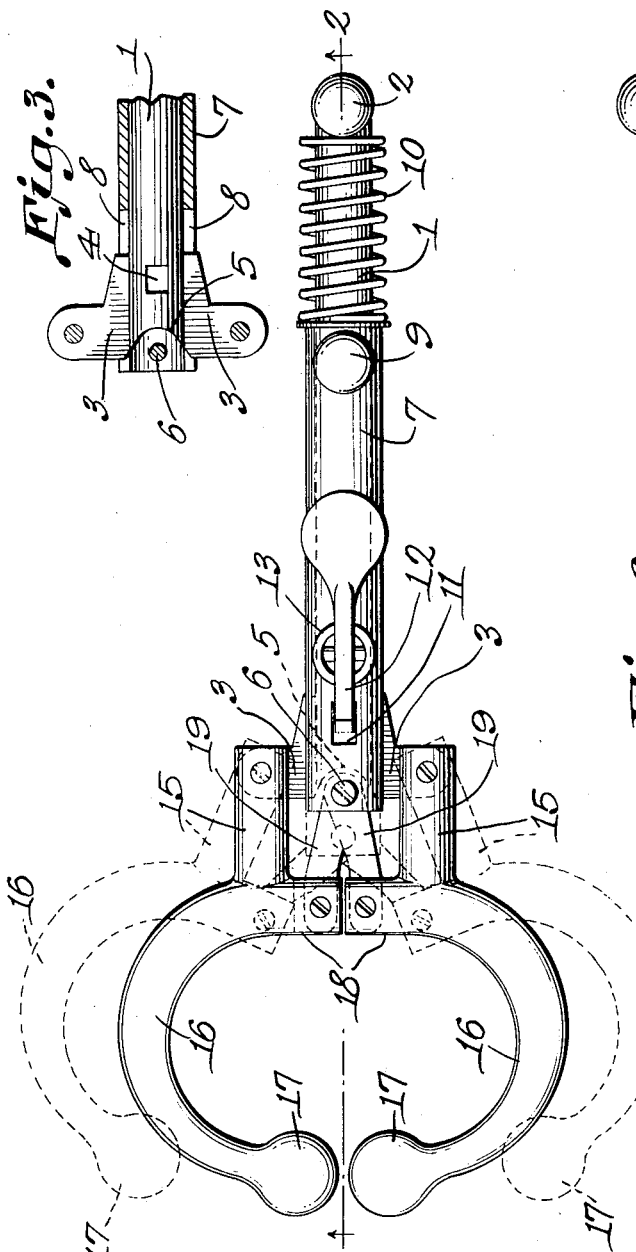
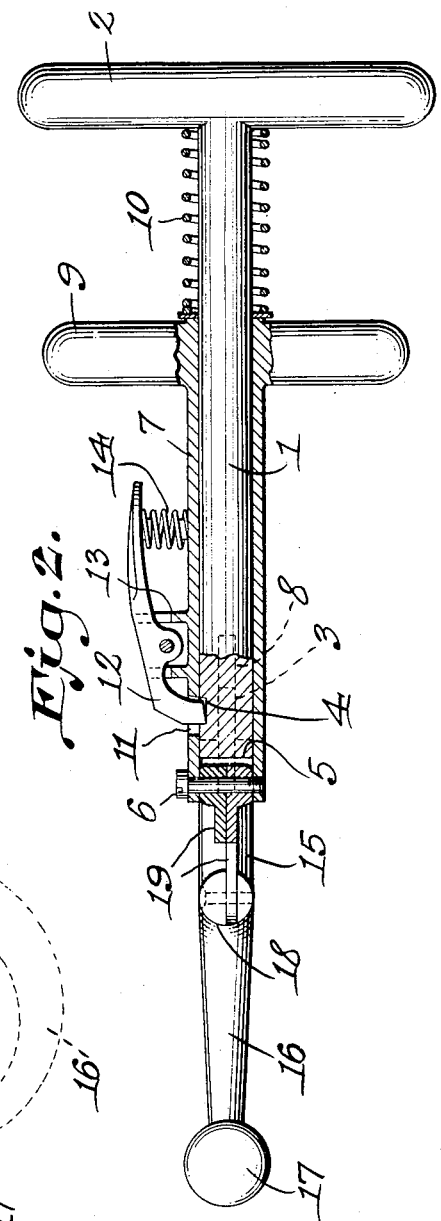
O. W. Hiner Inventor
By C. A. Snow & Co.
Attorneys.

Patented Nov. 14, 1933

1,934,801

UNITED STATES PATENT OFFICE 1,934,801

NOSE TONG FOR LIVESTOCK

Ora W. Hiner, Butler, Ind.

Application July 12, 1932. Serial No. 622,160

2 Claims. (Cl. 119—154)

This invention relates to tongs designed primarily for gripping the noses of livestock so that the animals can be more easily handled while being given medical attention or while being tested or examined by veterinarians or stockmen.

It is an object of the invention to provide strong and efficient tongs which can be handled entirely with one hand, leaving the other hand free to grasp the head of the animal during the application or removal of the tongs.

It is another object to provide tongs of simple construction which will not readily get out of order and which can be quickly applied and locked after once being brought to proper position and will automatically open when unlocked.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing:

Figure 1 is a plan view of the tongs the position of the jaws, when open, being indicated by broken lines.

Figure 2 is a section on line 2—2, Figure 1.

Figure 3 is a plan view of a portion of the stem and its cross head, a portion of the shiftable sleeve being shown in section.

Referring to the figures by characters of reference, 1 designates a stem provided at one end with a cross member 2 constituting a grip while its other end is provided with oppositely extending wings 3 forming a cross head. Adjacent to these wings is a notch 4 formed in the stem.

The terminal of the stem is recessed between the wings as indicated at 5 to provide a clearance for a pivot pin 6 which extends diametrically through one end portion of a sleeve 7. This sleeve is slidable on stem 1 and has opposed longitudinal slots 8 through which the cross head 3 extends. That end of the sleeve remote from pin 6 has a cross member 9 constituting a grip and this grip is normally held spaced from the grip 2 by a coiled spring 10 mounted on the stem 1 and thrusting against grip 2 and sleeve 7.

An opening 11 is formed in the sleeve and is adapted to receive one end of a latch lever 12 fulcrumed in a lug 13 on sleeve 7. Thus when sleeve 7 is moved forwardly on stem 1 to a predetermined position the latch lever, which is controlled by a spring 14, will snap into notch 4 and lock the sleeve and stem against relative movement.

Pivotally mounted on the outer end portions of the cross head 3 are arms 15 each of which has an integral yoke 16 provided with a terminal knob 17 constituting a jaw. The two yokes are oppositely disposed and each of them has a finger 18 extending therefrom adjacent to arm 15, these fingers projecting toward each other and terminating normally in front of stem 1. Links 19 are pivotally connected to the fingers and converge toward stem 1 where they engage the pivot pin 6.

Normally the jaws are open, as shown by broken lines in Figure 1. This is due to the fact that spring 10 exerts a forward thrust against sleeve 7, causing it to push through links 19 which thus act as a toggle to push the fingers 18 apart and shift the jaws 17 from each other. At this time latch lever 12 projects into opening 11 and rests on stem 1 at a point removed from notch 4.

When it is desired to apply the tongs the grips 2 and 9 are held in one hand, grip 2 being engaged by the palm and thumb while the fingers engage the grip 9. The other hand is then used for gripping the head of the animal and holding it while the tongs are being placed in position to grip the septum of the nose. As soon as the tongs have been properly placed the user moves the grips towards each other. This causes the toggle links to pull on fingers 18 and swing the jaws or knobs 17 into the respective nostrils so as to grip the septum. When the parts are brought to their final positions the latch lever will snap into notch 4 and thus hold the tongs as illustrated in full lines in Figure 1. The tongs can now be manipulated to manage the animal and when it is desired to release the same it is merely necessary to depress the latch lever 12 so as to disengage it from notch 4. Spring 10 will then expand and swing the jaws apart.

What is claimed is:

1. Nose tongs including a stem having a grip at one end for engagement by one hand of the user, a sleeve slidable on the stem and having a grip at one end for engagement by the said hand of the user, a spring on the stem interposed between the grips for holding said grips normally pressed apart, jaws pivotally connected to the stem, a toggle connection between the sleeve and jaws for swinging the jaws together about their pivots when the grips are moved toward each other against the action of the spring by the hand holding them, and means for automatically locking the sleeve and jaws when the jaws are moved together, said means being shiftable to release the spring to automatically shift the sleeve and open the jaws.

2. Nose tongs including a stem having a grip, a sleeve slidable thereon having a grip, both grips being positioned for simultaneous engagement by one hand of the user, a cross head carried by the stem and slidably engaged by the sleeve to hold the head and sleeve against relative rotation, opposed jaws, arms extending therefrom at opposite sides of the sleeve and pivotally connected to the cross head, fingers extending toward each other from the jaws and in front of the sleeve and stem, a toggle connection between said fingers and sleeve, a spring cooperating with the stem and sleeve for holding their grips normally spaced and the jaws normally spread apart, said spring being compressible by the movement toward each other of the grips held in the hand of the user, thereby to move the stem and sleeve relative to each other and close the jaws, and cooperating means on the sleeve and stem for automatically locking the jaws closed.

ORA W. HINER.